US012053860B2

(12) United States Patent
Ou

(10) Patent No.: US 12,053,860 B2
(45) Date of Patent: Aug. 6, 2024

(54) DRIVER TOOL WITH ROTATABLE TORQUE LIMITING SLEEVE

(71) Applicant: Yu-Hua Ou, Taichung (TW)

(72) Inventor: Yu-Hua Ou, Taichung (TW)

( * ) Notice: Subject to any disclaimer, the term of this patent is extended or adjusted under 35 U.S.C. 154(b) by 297 days.

(21) Appl. No.: 17/568,187

(22) Filed: Jan. 4, 2022

(65) Prior Publication Data

US 2023/0211476 A1 Jul. 6, 2023

(51) Int. Cl.

| | |
|---|---|
| ***B25B 15/02*** | (2006.01) |
| ***B25B 15/00*** | (2006.01) |
| ***B25B 23/00*** | (2006.01) |
| ***B25B 23/14*** | (2006.01) |
| ***B25B 23/142*** | (2006.01) |

(52) U.S. Cl.

CPC .............. *B25B 15/02* (2013.01); *B25B 23/00* (2013.01); *B25B 23/14* (2013.01); *B25B 23/1405* (2013.01); *B25B 23/1427* (2013.01); *B25B 15/001* (2013.01)

(58) Field of Classification Search

CPC ......... B25B 15/00; B25B 15/02; B25B 15/04; B25B 15/06; B25B 17/00; B25B 23/00; B25B 23/0007; B25B 23/0021; B25B 23/0028; B25B 23/0035; B25B 23/0042; B25B 23/14; B25B 23/142; B25B 13/46; B25B 13/463; B25B 13/468; B25B 23/1422; B25B 23/1427

USPC .......... 81/436–439, 467, 476, 474, 478, 480

See application file for complete search history.

(56) References Cited

U.S. PATENT DOCUMENTS

| | | | | |
|---|---|---|---|---|
| 4,583,277 | A * | 4/1986 | Horwitt | B25B 23/141 29/559 |
| 5,615,587 | A * | 4/1997 | Foerster, Jr. | B25B 23/101 81/125 |
| 6,347,564 | B1 * | 2/2002 | Ciocca | F16D 3/207 81/177.8 |
| 11,597,063 | B2 * | 3/2023 | Witte | B25B 23/141 |
| 2008/0070190 | A1 * | 3/2008 | Baumgartner | A61B 17/8891 433/141 |
| 2011/0092295 | A1 * | 4/2011 | Wernz | A61B 17/1631 464/37 |
| 2011/0162492 | A1 * | 7/2011 | Wilson | H01R 13/622 81/475 |
| 2011/0209584 | A1 * | 9/2011 | Suter | F16D 41/088 192/41 R |

(Continued)

*Primary Examiner* — Steven M Cernoch
*Assistant Examiner* — Kent N Shum
(74) *Attorney, Agent, or Firm* — Muncy, Geissler, Olds & Lowe, P.C.

(57) ABSTRACT

A constant torque tool provided, including: a driver body, including a handle and a working rod connected with the handle, at least one of the handle and the working rod being integrally formed with a first blocking structure; a sleeve member, being rotatably disposed around the driver body and integrally formed with a second blocking structure, the second blocking structure being releasably stuck with the first blocking structure in a rotation direction of the sleeve member; wherein when there is a relative torque greater than a predetermined torque between the sleeve member and the driver body, at least one of the second blocking structure and the first blocking structure deforms and the second blocking structure is slidable over the first blocking structure in the rotation direction.

3 Claims, 5 Drawing Sheets

(56) References Cited

U.S. PATENT DOCUMENTS

| | | | | |
|---|---|---|---|---|
| 2013/0340579 | A1* | 12/2013 | Santamarina | B25B 15/001 81/474 |
| 2015/0090078 | A1* | 4/2015 | Yu | B25B 15/04 81/475 |
| 2015/0165608 | A1* | 6/2015 | Ivinson | B25B 23/0042 81/475 |
| 2015/0252855 | A1* | 9/2015 | Jakoubek | B25B 23/141 464/37 |
| 2017/0105813 | A1* | 4/2017 | Rash | A61B 17/8875 |
| 2017/0365949 | A1* | 12/2017 | Montena | B25B 23/141 |
| 2017/0367748 | A1* | 12/2017 | Plotkin | B25B 23/0042 |
| 2020/0001443 | A1* | 1/2020 | Mathias | B25B 23/1427 |
| 2020/0282530 | A1* | 9/2020 | Sharifi-Mehr | A61B 17/8888 |

* cited by examiner

DRIVER TOOL WITH ROTATABLE TORQUE LIMITING SLEEVE

BACKGROUND OF THE INVENTION

Field of the Invention

The present invention relates to a constant torque tool.

Description of the Prior Art

Generally, a tool with a handle and a screwdriver head is used to drive a fastener, such as a screw or the like, to an object, for assembling or connection. The user holds the handle and inserts the screwdriver head within a receiving hole of the fastener to facilitate turning the fastener.

It is noted that the conventional screwdriver tool does not have any torque control mechanism, which can cause failure of fastening easily and cause excessive torque to damage the fastener.

In the locking operation, if the torque applied is insufficient, it may cause the fastener to loosen, which not only causes danger but also affects its working quality; if the torque applied is excessive, the receiving hole of the fastener can be damaged, which also affects fastening effect of the fastener.

The present invention is, therefore, arisen to obviate or at least mitigate the above-mentioned disadvantages.

SUMMARY OF THE INVENTION

The main object of the present invention is to provide a constant torque tool with which it is avoided that the driven piece is damaged due overdriving of the torque tool.

To achieve the above and other objects, a constant torque tool provided, including: a driver body, including a handle and a working rod connected with the handle, at least one of the handle and the working rod being integrally formed with a first blocking structure; a sleeve member, being rotatably disposed around the driver body and integrally formed with a second blocking structure, the second blocking structure being releasably stuck with the first blocking structure in a rotation direction of the sleeve member; wherein when there is a relative torque greater than a predetermined torque between the sleeve member and the driver body, at least one of the second blocking structure and the first blocking structure deforms and the second blocking structure is slidable over the first blocking structure in the rotation direction.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
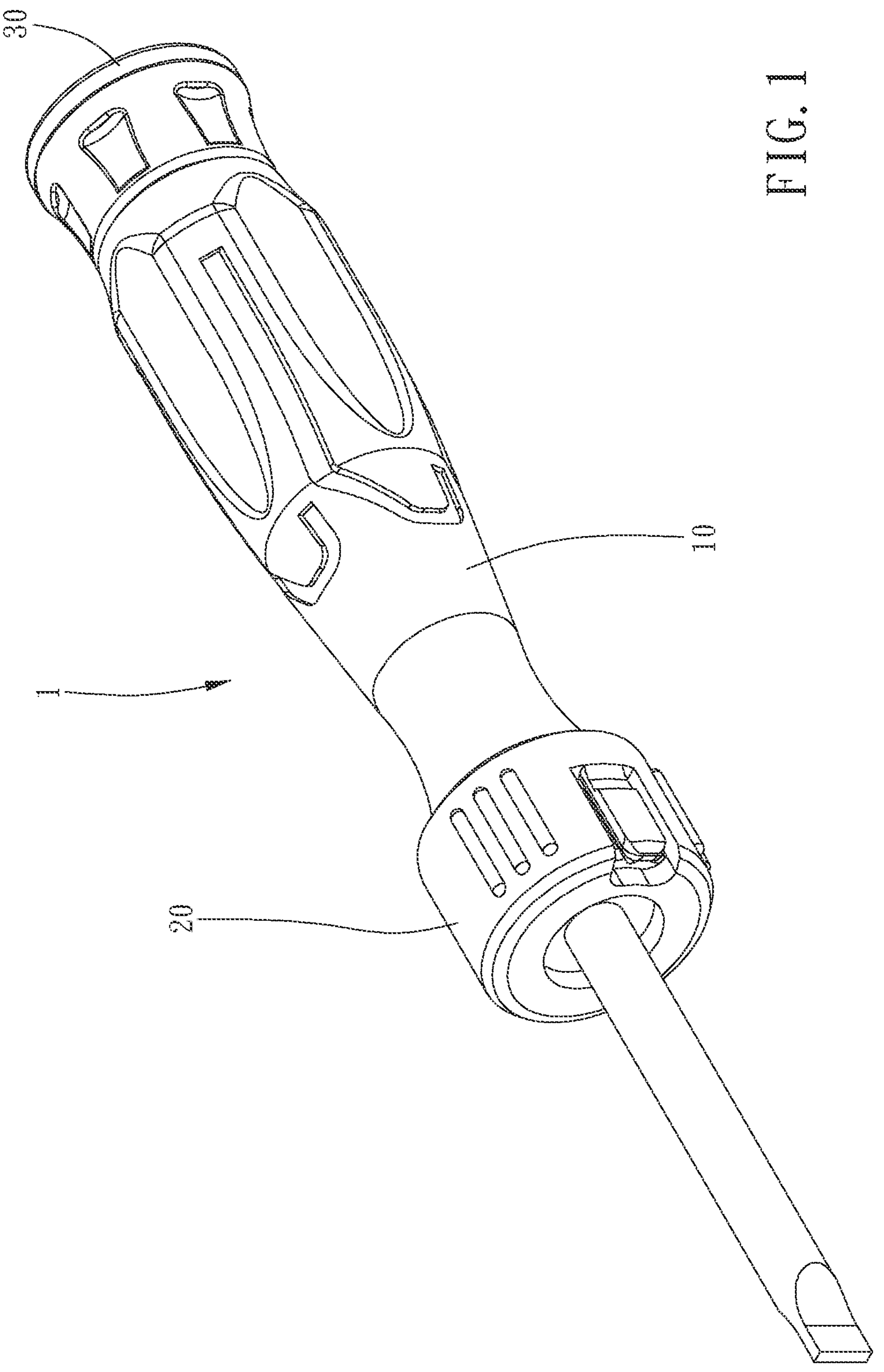
FIG. 1 is a stereogram of a preferable embodiment of the present invention.
Figure 2:
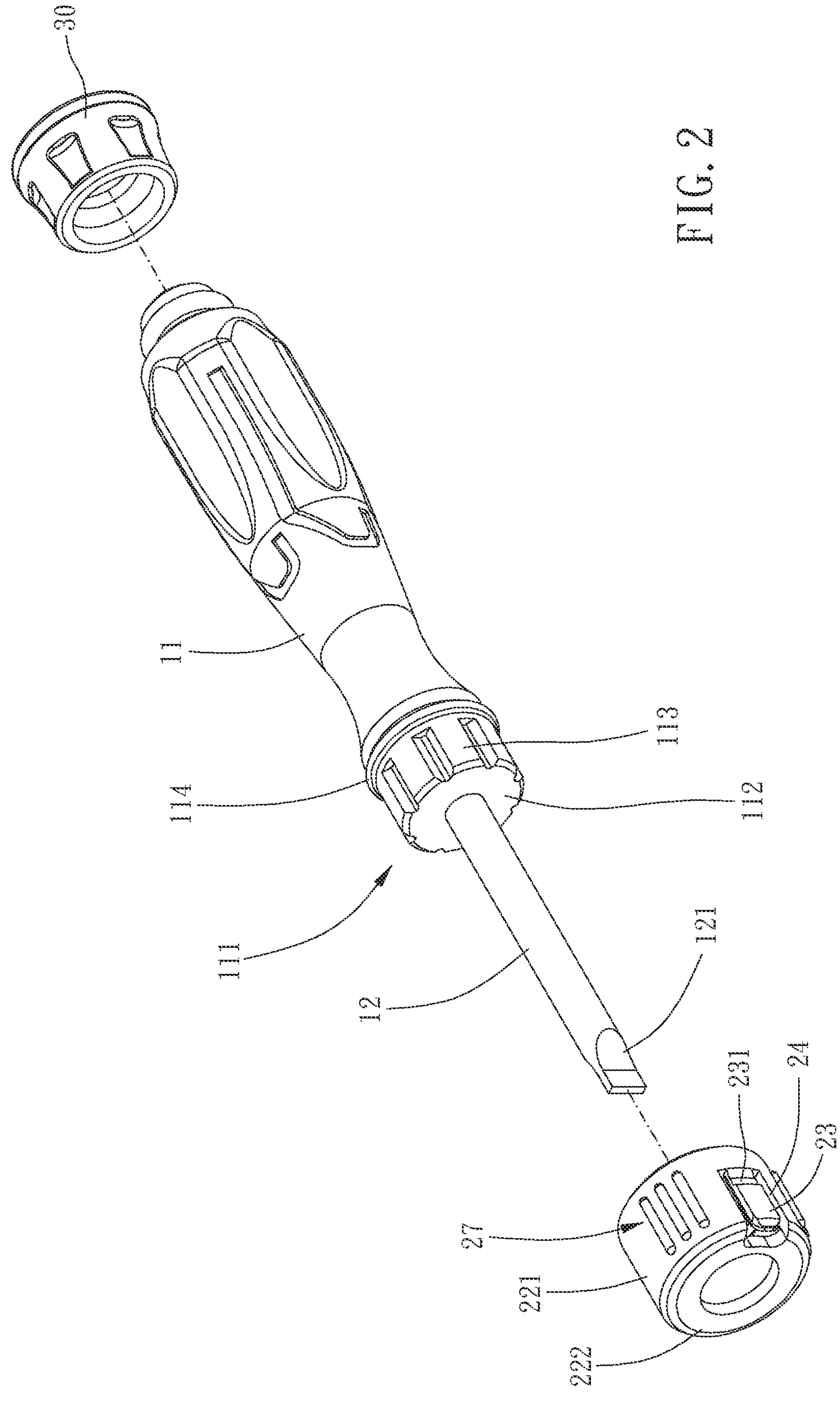
FIG. 2 is a breakdown drawing of a preferable embodiment of the present invention.
Figure 3:
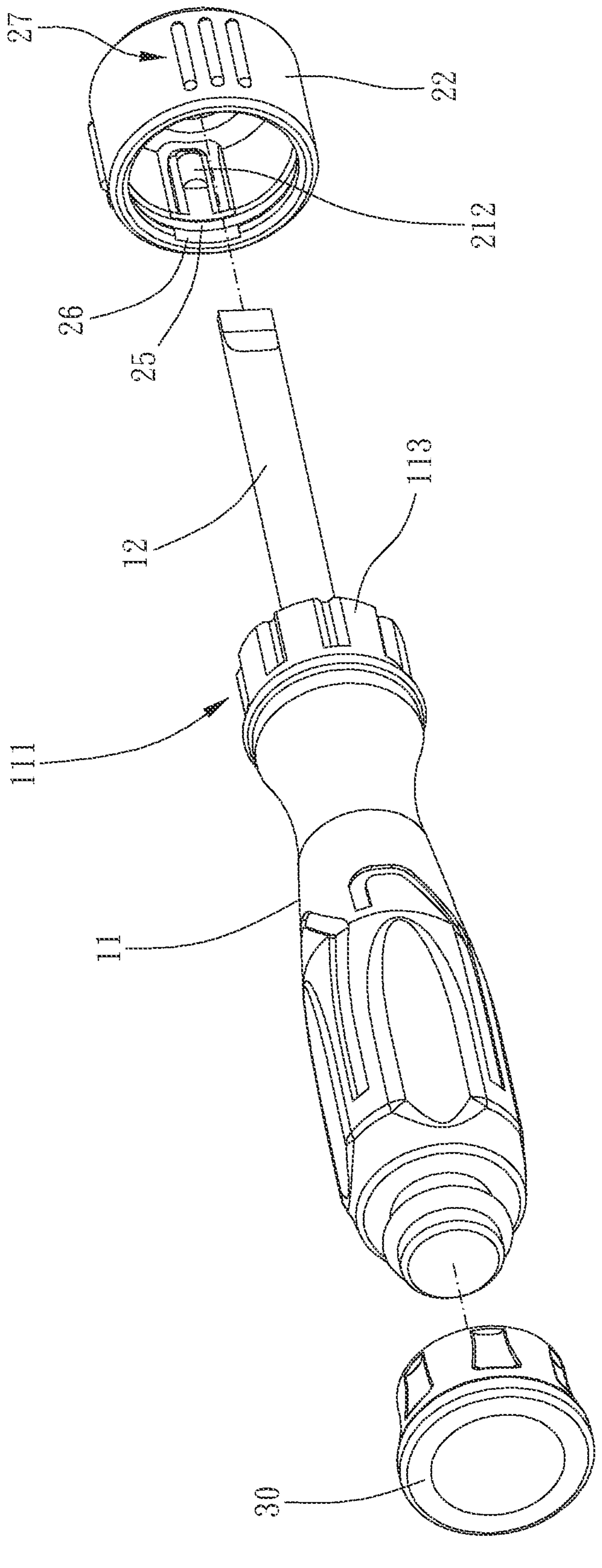
FIG. 3 is another breakdown drawing in another view angle according to a preferable embodiment of the present invention.
Figure 4:
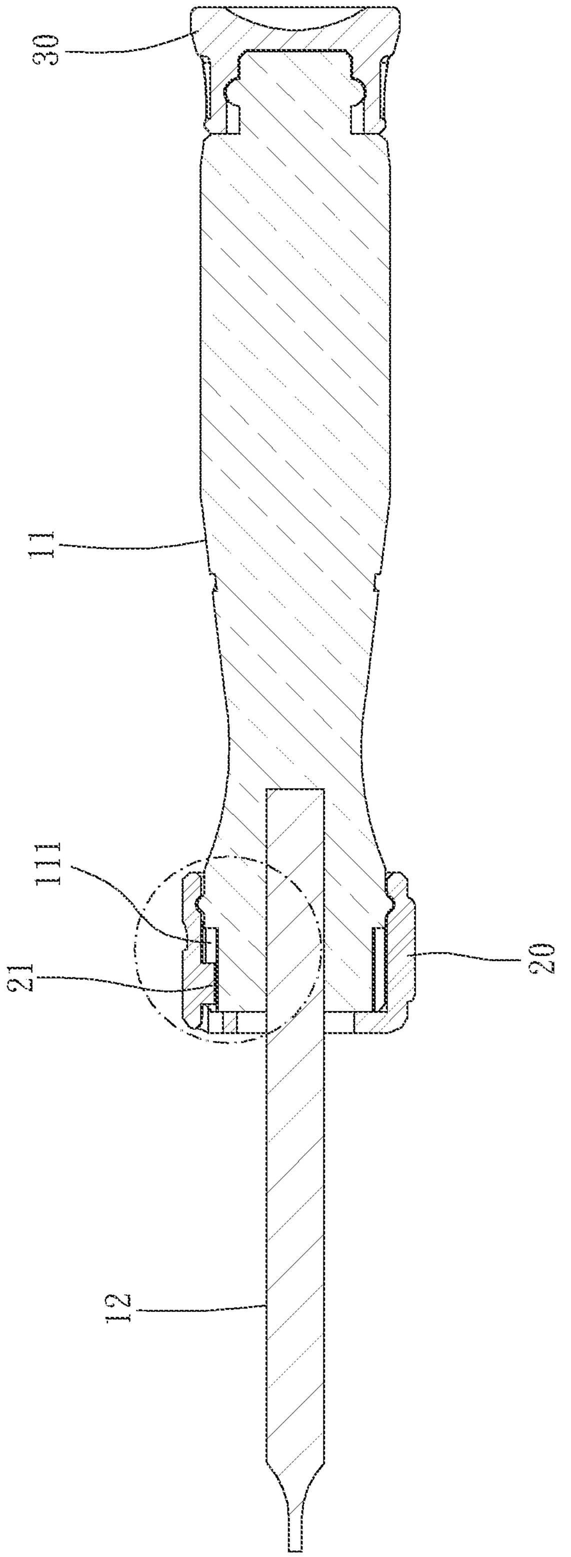
FIG. 4 is a cross-sectional view of a preferable embodiment of the present invention.
Figure 5:
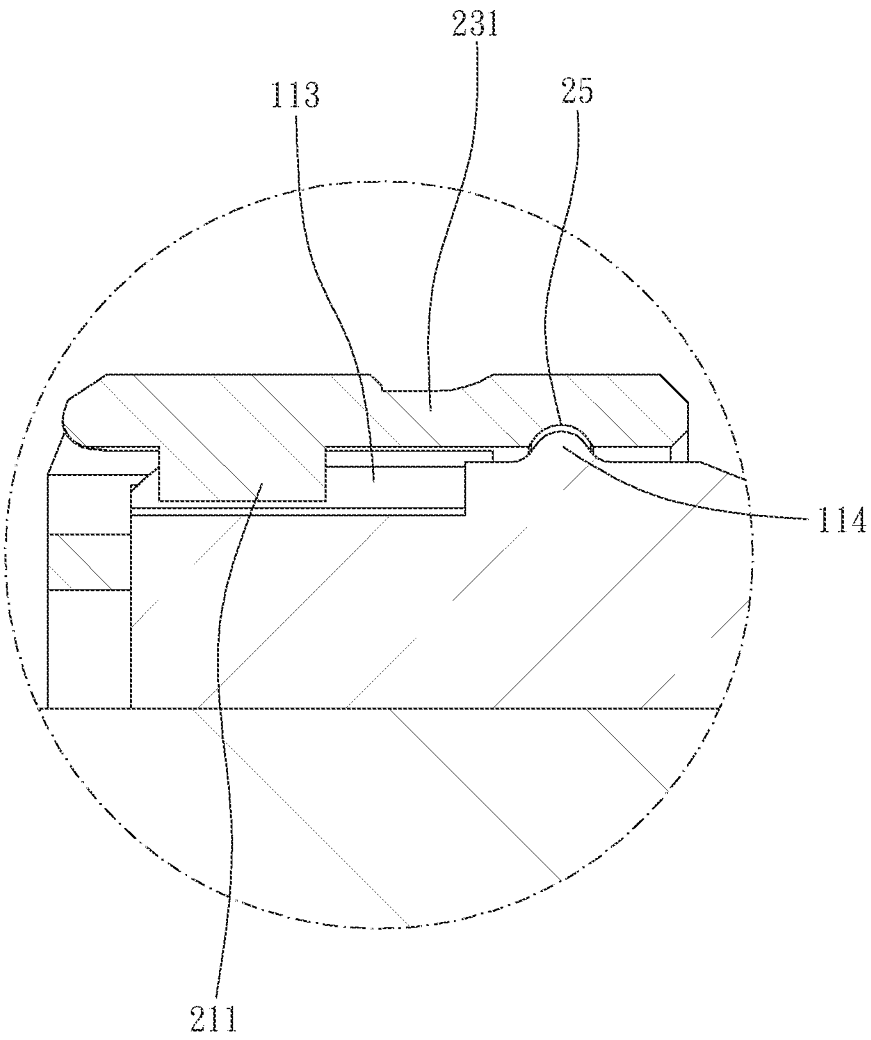
FIG. 5 is a partial enlargement of FIG. 4.

Please refer to FIGS. 1 to 5 for a preferable embodiment of the present invention. A constant torque tool 1 of the present invention includes a driver body 10 and a sleeve member 20.

The driver body 10 includes a handle 11 and a working rod 12 connected with the handle 11, and at least one of the handle 11 and the working rod 12 is integrally formed with a first blocking structure 111. The sleeve member 20 is rotatably disposed around the driver body 10, the sleeve member 20 is integrally formed with a second blocking structure 21, and the second blocking structure 21 is releasably stuck with the first blocking structure 111 in a rotation direction of the sleeve member 20. When there is a relative torque greater than a predetermined torque between the sleeve member 20 and the driver body 10, at least one of the second blocking structure 21 and the first blocking structure 111 deforms and the second blocking structure 21 is slidable over the first blocking structure 111 in the rotation direction. Whereby, it is avoided that the driven piece (such as screw or other fastener) is damaged due overdriving of the torque tool.

In this embodiment, the handle 11 is integrally formed of plastic material, and the sleeve member 20 is integrally formed of plastic material. The plastic member can be made by injection molding, which is fast and convenient; and the plastic member has good structural strength and sufficient deformability, which is applicable for constant torque mechanism. However, at least one of the handle 11 and the sleeve member 20 may be made of metal or other material.

Specifically, the handle 11 includes a first end portion 112, the working rod 12 is connected with the first end portion 112, the sleeve member 20 is rotatably disposed around the first end portion 112, and the first end portion 112 is integrally formed with the first blocking structure 111. The second blocking structure 21 includes at least one projection 211, and the at least one projection 211 is integrally formed on an inner face of the sleeve member 20. However, the first blocking structure 111 may be disposed on the working rod 12.

Preferably, the first blocking structure 111 includes a plurality of projections 113, providing stable engagement, precise disengagement and constant torque. The plurality of projections 113 are circumferentially and separately arranged on the driver body 10, and the plurality of projections 113 extend in an axial direction of the driver body 10. Specifically, the plurality of projections 113 are circumferentially and equiangularly arranged on the handle 11 and extend to an end face of the handle 11, which prevents interference of the second blocking structure 21 of the sleeve member 20 and the handle 11 and is advantageous for assembling.

In this embodiment, each of the plurality of projections 113 of the first blocking structure 111 is radially tapered outwardly; each of the plurality of projections 211 of the second blocking structure 21 includes a convex surface 212 facing the first blocking structure 111, and each said convex surface 212 of the second blocking structure 21 is releasably blocked between adjacent two of the plurality of projections 113 of the first blocking structure 111; With the projection 113 which is tapered and the convex surface 212, the second blocking structure 21 can slide over the first blocking structure 111 smoothly, stably and precisely.

Preferably, the sleeve member 20 is integrally formed and includes a sleeve body 22 and at least one elastic arm 23 connected with the sleeve body 22, and the at least one elastic arm 23 includes the second blocking structure 21. The sleeve member 20 further includes a slot 24 disposed around the elastic arm 23, and the slot 24 extends on a circumferential wall 221 and a top wall 222 of the sleeve body 22; the elastic arm 23 includes a connection section 231 which is thinner than the circumferential wall 221 of the sleeve body 22 and connected with the circumferential wall 221, and thus the elastic arm 23 can swing well.

The handle 11 further includes a flange 114 extending circumferentially, the inner face of the sleeve member 20 further includes an annular groove 25 extending circumferentially, and the flange 114 is movably received within the annular groove 25, so that the sleeve member 20 is rotatable along the annular groove 25. The inner face of the sleeve member 20 further includes a recess 26, and the recess 26 is in communication with the annular groove 25 and open at an end face of the sleeve member 20.

In this embodiment, the working rod 12 is encompassed by the handle 11 and is integrally formed with a screwdriver head 121 (flat head, Philips head, hexagonal head or the like); however, the working rod may be provided with a receiving hole for connection of a screwdriver bit.

Preferably, the sleeve member 20 further includes a plurality of concave-convex structures 27, and the plurality of concave-convex structures 27 are circumferentially and equiangularly arranged on an outer surface of the circumferential wall 221, for gripping the sleeve member 20 firmly; the constant torque tool 1 further includes an end cap 30, and the end cap 30 is rotatably disposed on a distal end of the handle 11 opposite to the working rod 12, wherein the end cap 30 is configured for being abutted on the palm of a hand so that the fingers of the hand can rotate the driver body 10 or the sleeve member 20 easily and quickly.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A constant torque tool, including:

a driver body, including a handle and a working rod connected with the handle, at least one of the handle and the working rod being integrally formed with a first blocking structure; and a sleeve member, being rotatably disposed around the driver body and integrally formed with a second blocking structure, the second blocking structure being releasably stuck with the first blocking structure in a rotation direction of the sleeve member;

wherein when there is a relative torque greater than a predetermined torque between the sleeve member and the driver body, at least one of the second blocking structure and the first blocking structure deforms and the second blocking structure is slidable over the first blocking structure in the rotation direction;

wherein the second blocking structure includes at least one projection, and the at least one projection is integrally formed on an inner face of the sleeve member;

wherein the sleeve member is integrally formed of one piece and includes a sleeve body and at least one elastic arm connected with the sleeve body, and the at least one elastic arm includes the second blocking structure;

wherein the handle is integrally formed of plastic material;

the sleeve member is integrally formed of plastic material;

the first blocking structure includes a plurality of projections, the plurality of projections of the first blocking structure are circumferentially and equiangularly arranged on the handle;

the plurality of projections of the first blocking structure extend to an end face of the handle in an axial direction of the driver body;

each of the plurality of projections of the first blocking structure is radially tapered outwardly;

the second blocking structure includes a plurality of projections;

each of the plurality of projections of the second blocking structure includes a convex surface facing the first blocking structure, and each said convex surface of the second blocking structure is releasably blocked between adjacent two of the plurality of projections of the first blocking structure;

the handle further includes a flange on an outer surface of the handle, the flange extending circumferentially and extending radially from the outer surface of the handle outward from the working rod, the inner face of the sleeve member further includes an annular groove extending circumferentially, and the flange is movably received within the annular groove;

the sleeve member further includes a slot disposed around the elastic arm, and the slot extends on a circumferential wall and a top wall of the sleeve body, wherein the slot extends through an inner circumferential surface and an outer circumferential surface of the sleeve body, wherein the outer circumferential surface is more radially extant from the working rod than the inner circumferential surface;

the elastic arm includes a connection section which is thinner than the circumferential wall of the sleeve body and connected with the circumferential wall;

the sleeve member further includes a plurality of concave-convex structures, and the plurality of concave-convex structures are circumferentially and equiangularly arranged on the outer circumferential surface of the sleeve body;

the inner face of the sleeve member further includes a recess, and the recess is in communication with the annular groove and open at an end face of the sleeve member, wherein the end face is on an end opposite from the top wall of the sleeve body.

2. The constant torque tool of claim 1, further including an end cap, wherein the end cap is rotatably disposed on a distal end of the handle opposite to the working rod.

3. The constant torque tool of claim 1, wherein the handle includes a first end portion, the working rod is connected with the first end portion, the sleeve member is rotatably disposed around the first end portion, and the first end portion is integrally formed with the first blocking structure.

* * * * *